Figure 1:
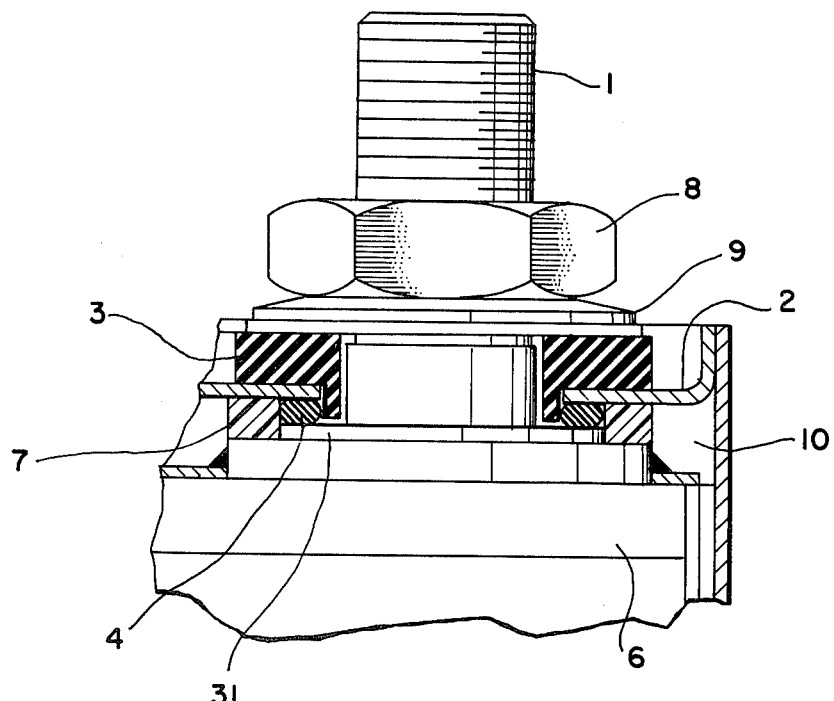

United States Patent [19]

Münch et al.

[11] 4,053,693
[45] Oct. 11, 1977

[54] POLE BOLT SEAL FOR GALVANIC CELLS

[75] Inventors: Erich Münch, Frankfurt am Main; Bernd Gnida, Fischbach, both of Germany

[73] Assignee: Varta Batterie Aktiengesellschaft, Germany

[21] Appl. No.: 602,393

[22] Filed: Aug. 6, 1975

[30] Foreign Application Priority Data

Aug. 19, 1974 Germany .................. 7428070[U]

[51] Int. Cl.² ........................................ H01M 2/06
[52] U.S. Cl. ............................................... 429/183
[58] Field of Search ................. 136/168, 169, 133; 429/183

[56] References Cited

U.S. PATENT DOCUMENTS

| 1,312,038 | 8/1919 | Luhrman | 136/168 |
| 1,585,874 | 5/1926 | Powell | 136/168 |
| 3,068,313 | 12/1962 | Daley | 136/133 |

FOREIGN PATENT DOCUMENTS

| 525,199 | 9/1921 | France | 136/168 |
| 869,489 | 11/1941 | France | 136/168 |

Primary Examiner—Donald L. Walton
Attorney, Agent, or Firm—Weiser, Stapler & Spivak

[57] ABSTRACT

The sealing ring which encircles the pole bolt protruding through a cell cover is compressed between the cover and the head of the pole bolt. The degree of compression is limited by a non-elastic spacer ring encircling the sealing ring.

1 Claim, 2 Drawing Figures

POLE BOLT SEAL FOR GALVANIC CELLS

The present invention relates to a pole bolt seal for galvanic elements, and especially for hermetically sealed cells, utilizing a sealing ring of elastic material, and an insulating ring between pole bolt and cell cover.

For pole bolts which are electrically insulated from the cell cover, it is often quite difficult to provide reliable sealing. It has been found that, particularly for alkaline storage batteries, the electrolyte escapes because of so-called creepage even through the narrowest gaps in the cell housing. This leads to loss of electrolyte and gradual drying out of the cell. It also leads to deterioration of adjacent metallic parts, such as the cable clamps or the connector cable.

It is known to prevent escape of the electrolyte by means of tightly fitted elastic sealing discs or sealing sleeves. However, these are also incapable of providing a permanent seal. The available elastic materials frequently become brittle or crack. Particularly undesirable is the loss of elasticity which they undergo with the passage of time. To achieve permanent sealing, the pole bolt nut is periodically tightened. In this way, the subsisting elasticity of the sealing material is utilized, until this material begins to exhibit plastic properties due to the frequent tightening. When that happens, reliable sealing is no longer possible.

Moreover, because of the material fatigue noted above, such seals cannot be simply reused after disassembly for service or repair.

Accordingly, it is an object of the invention to prevent the material fatigue of the elastic sealing ring.

It is another object to provide reliable protection against electrolyte escape for the pole bolt seal of galvanic elements.

These and other objects which will appear are accomplished in accordance with the invention by placing the sealing ring adjacent the cell cover and the pole bolt, positioned so that it extends radially between the annular shoulder of the insulating ring and a spacer ring made of non-elastic material.

Figure 2:
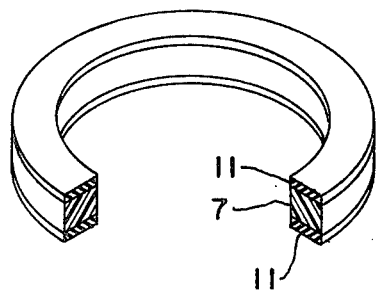

For further details, reference may be made to the discussion which follows, in the light of the accompanying drawings wherein:

FIG. 1 is a view, partly in cross-section, of a pole bolt and sealing construction embodying the invention; and FIG. 2 is a cut away view of an alternative form of a portion of the embodiment of FIG. 1.

Referring to FIG. 1, the pole bolt 1 protrudes through an opening in cell cover 2. Electrical insulation is provided by an insulating ring 3 encircling pole bolt 1. The shoulder 31 of insulating ring 3 extends into a recess between pole bolt 1 and cell cover 2. The lower portion of this ring shoulder is encircled by the sealing ring 4, proper. Sealing ring 4 is positioned between cell cover 2, above it, and the lower portion of pole bolt 1, which is in the shape of a bolt head. Pole bolt 1 rests on plate yoke 6, by means of which all the plates are conected to each other.

Between plate yoke 6 and cell cover 2 a non-elastic spacer ring 7 is provided, which encircles sealing ring 4. By means of spacer ring 7, pressure exerted by cell cover 2 and pole bolt 1 can be applied to sealing ring 4 (O-ring). The pressure so applied to sealing ring 4 is a function of the height of spacer ring 7. This makes it possible to apply that pressure which is optimum for the sealing ring, in order that the material of this sealing ring shall remain elastic. The actual pressure is applied by tightening of pole bolt nut 8. In order to keep pole bolt nut 8 elastically under tesion, a spring washer 9 is preferably inserted between it and insulating ring 3.

It is preferred that sealing ring 4 can be separated from the electrolyte spacer 10 by its encircling spacer ring 7. This provides high reliability protection for the sealing ring from attack by free acid during movement of the cell.

A particular advantage of the invention is its permanent, fatigue-free pole bolt seal. Also, the predetermined height of the spacer ring provides a precise limit to the tightening of the pole bolt nut.

As shown in FIG. 2, the spacer ring construction may be modified by sandwiching the non-elastic spacer ring 7, proper, between upper and lower layers 11 of elastic material. This further improves the sealing effectiveness of the structure.

The spacer ring may be made of substantially non-elastic, acid resistant plastic such as polysulphonate. The sealing materials may be of conventional O-ring type, such as acid resistant synthetic rubber.

We claim:

1. In a sealing arrangement for a galvanic cell having a cell cover, a pole bolt which protrudes through an aperture in the cell cover, and a pole bolt nut, the improvement comprising:
    a sealing ring of elastic material which encircles the bolt and which is positioned for compression in response to tightening of the nut,
    a spacer ring encircling the sealing ring and positioned to be subjected to pressure in response to tightening of the nut,
    said spacer ring being substantially inelastic,
    said cover, bolt, nut, sealing ring and spacer ring being so positioned and proportioned relative to each other that the spacer ring limits the tightening of the nut, whereby the compression of the sealing ring is also limited by the spacer ring alone, and
    annular insulating means encircling the pole bolt between the bolt and the sealing ring.

* * * * *